United States Patent
Schach et al.

(10) Patent No.: US 7,545,070 B2
(45) Date of Patent: Jun. 9, 2009

(54) COMMUTATOR MOTOR HAVING A NUMBER OF FIELD WINDING GROUPS

(75) Inventors: Rainer Schach, Berlin (DE); Joerg Skrippek, Priort (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 11/587,907

(22) PCT Filed: Apr. 29, 2005

(86) PCT No.: PCT/EP2005/051957

§ 371 (c)(1),
(2), (4) Date: Oct. 26, 2006

(87) PCT Pub. No.: WO2005/109611

PCT Pub. Date: Nov. 17, 2005

(65) Prior Publication Data

US 2007/0247014 A1    Oct. 25, 2007

(30) Foreign Application Priority Data

May 3, 2004    (DE) ........................ 10 2004 021 661

(51) Int. Cl.
*H02K 3/28* (2006.01)
*H02K 27/04* (2006.01)
(52) U.S. Cl. .................. 310/184; 310/180; 310/75 R; 318/244; 318/252; 388/826
(58) Field of Classification Search ............... 310/158, 310/179, 180, 184, 198, 182, 197, 75 R; 318/244, 318/245, 246–252; 388/826, 827
See application file for complete search history.

(56) References Cited

U.S. PATENT DOCUMENTS

| 468,128 | A | | 2/1892 | Blackwell | |
|---|---|---|---|---|---|
| 942,463 | A | * | 12/1909 | Rogers | 388/826 |
| 1,862,922 | A | | 6/1932 | Churchward | |
| 1,870,292 | A | * | 8/1932 | McCormick | 322/71 |
| 2,310,131 | A | * | 2/1943 | Tofflinger | 318/244 |
| 2,807,736 | A | * | 9/1957 | Jensen | 310/184 |
| 2,923,873 | A | * | 2/1960 | Annis | 388/826 |

(Continued)

FOREIGN PATENT DOCUMENTS

DE    197 53 670    6/1998

(Continued)

OTHER PUBLICATIONS

International Search Report PCT/EP2005/051957.

*Primary Examiner*—Karl I Tamai
(74) *Attorney, Agent, or Firm*—James E. Howard

(57) ABSTRACT

A commutator motor, which has a series excitation or shunt excitation and which, in particular, is suited for use as a drive motor for a washing drum of a laundry treatment device. The stator of a commutator motor of this type has a number of field winding groups with field windings that are arranged symmetric to the plane of symmetry of the pair of poles and whose starting points and end points are connected to one another. In order to operate the commutator motor in a number of rotational speed ranges, the field winding groups are individually or jointly activated by a control device.

6 Claims, 2 Drawing Sheets

U.S. PATENT DOCUMENTS

Figure 1:
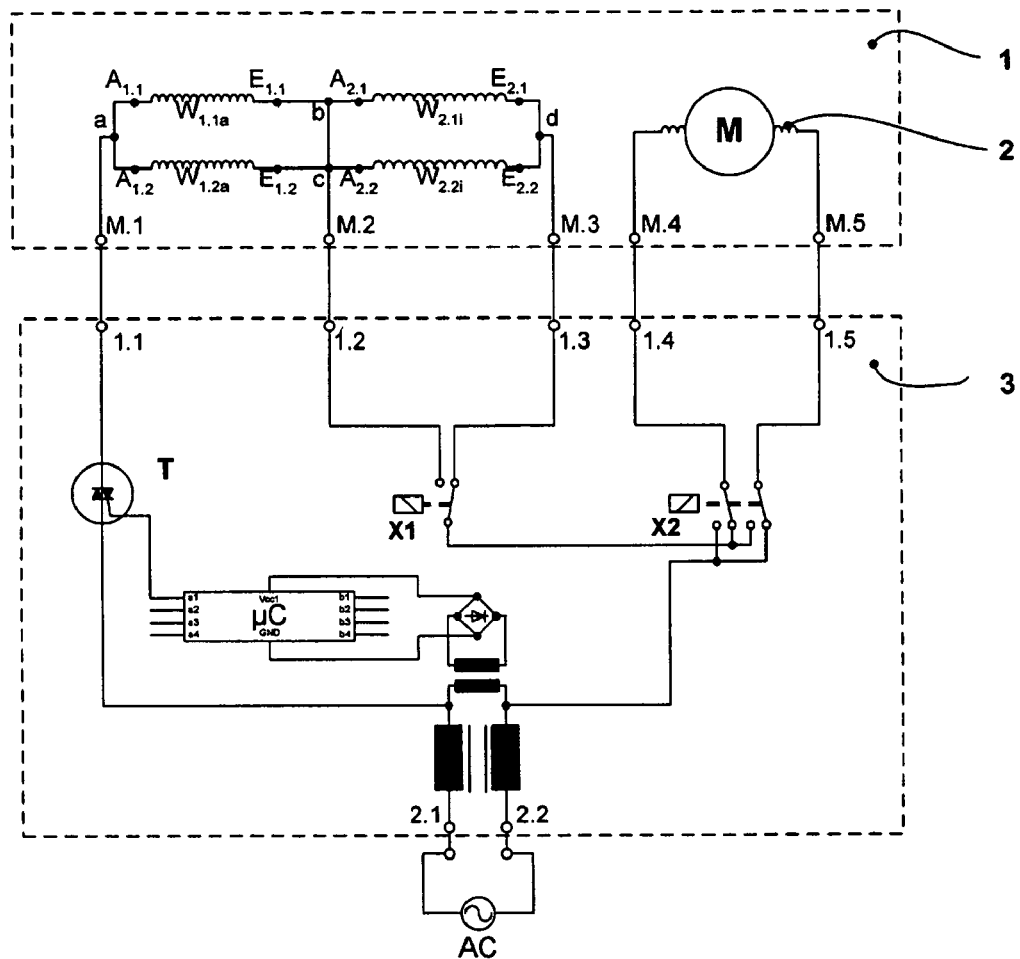

| | | | | |
|---|---|---|---|---|
| 3,493,833 A | * | 2/1970 | Swanke | 318/252 |
| 3,678,357 A | * | 7/1972 | Swanke et al. | 318/245 |
| 3,924,169 A | * | 12/1975 | Craft et al. | 388/826 |
| 5,648,706 A | * | 7/1997 | Polk et al. | 318/376 |
| 5,672,922 A | * | 9/1997 | Raichle et al. | 310/68 A |
| 2007/0247014 A1 | * | 10/2007 | Schach et al. | 310/184 |

FOREIGN PATENT DOCUMENTS

| | | | |
|---|---|---|---|
| DE | 198 25 126 | | 12/1999 |
| GB | 690496 | * | 4/1953 |
| GB | 1 213 526 | | 11/1970 |
| JP | 54-075009 | * | 6/1979 |
| JP | 56-121357 | * | 9/1981 |
| JP | 58-157357 | * | 9/1983 |

* cited by examiner

COMMUTATOR MOTOR HAVING A NUMBER OF FIELD WINDING GROUPS

The invention relates to a commutator motor which can be operated with series or shunt excitation and is particularly suitable as a drive motor for a laundry drum of a laundry treatment machine.

An arrangement for setting the rotational speed of a commutator motor of this type is known from DE 198 25 126 A1. The commutator motor has at least two field windings, of which one field winding has a field tapping point. The field windings can also comprise a plurality of winding elements with electrical connections positioned between the winding elements. The field windings or field winding elements are switched on or have voltage applied to them separately or together by control electronics in accordance with the required rotational speeds. The end points of the individual field windings or field winding elements of the field windings are connected to the starting points of the other field windings or field winding elements of the field windings, that is to say the field windings are connected in series with one another.

DE 197 53 670 A1 discloses a field winding design of a two-pole commutator motor, in which two field winding elements (high and low coil) are arranged one above the other on each pole. The commutator motor is connected such that the end point of a field winding of the first field winding group (low coil) is connected to the starting point of the second field winding group (high coil), and the end point of a field winding of the second field winding group is connected to a starting point of the armature winding. Furthermore, the end point of the armature winding is connected to the starting point of the other field winding of the second field winding group, and the end point of the other field winding of the second field winding group is connected to the starting point of the other field winding of the first field winding group. An electrical connection is provided between the field winding elements so that either only the low coils can be switched on or the low and high coils which are connected in series can be switched on together. In a design of this type, the individual field winding elements are arranged symmetrically to the axis of symmetry of the pole pair.

The commutator motors described above require the windings to be formed with a relatively thick winding wire on account of the series connection of the field winding elements. One disadvantage of this is that, when a wire of this type is used, the so-called winding head cannot be formed in an optimum manner during winding of the field windings, or the winding head has to be formed afterwards in a further production step in a complicated fashion. The unfavorably formed winding head of such commutator motors causes additional electrical losses, as a result of which the efficiency of the commutator motor is reduced.

On the basis of this prior art, the object of the invention is to provide a commutator motor of the above type with a winding and circuit design, which commutator motor can be operated in various rotational speed ranges and at the same time produces the lowest possible losses during operation.

The object is achieved by the invention according to the claims by the commutator motor having a stator which has an even number of poles, on each of which a plurality of field windings which each have a starting point and an end point are arranged one above the other, with a field winding of one pole and the field winding which is situated opposite the field winding symmetrically with respect to the respective plane of symmetry of the pole pair having an identical number of turns and forming one field winding group, and the starting points of the field windings of one field winding group being connected to one another, and the end points of the field windings of the same field winding group being connected to one another. On account of the inventive design of the stator, the field windings of the respective field winding group are advantageously connected in parallel and arranged symmetrically to one another on respectively opposite poles of the stator. As a result of an arrangement of this type, the field windings of one field winding group have identical line lengths as well as the same number of turns. The field windings of one field winding group therefore have identical resistances and inductivities. Interfering compensating currents between the field winding groups and the electrical losses which are thus produced are advantageously avoided. Furthermore, the commutator motor is suitable for operation at different rotational speeds since the field winding groups can be switched on individually or together via the electrical connections of the commutator motor in accordance with a rotational speed requirement.

In one advantageous development of the invention, the end point of one field winding group is connected to the starting point of another field winding group and an electrical connection of the commutator motor. The field winding groups are therefore connected in series when the field winding groups are switched on together. This type of design of the commutator motor simplifies design of the windings since the electrical resistance of the field winding groups which are connected in series is produced by summing the resistances of the individual field winding groups and an identical current is produced in all of the field winding groups.

In one advantageous development of the invention, field windings of different field winding groups have a different number of turns. Designing the field windings in this way is therefore predominantly favorable since the number of windings which is favorable for operation can be matched to the set rotational speed and/or power requirements. The magnetic flux and the electrical resistance of a field winding is proportional to the number of turns of the field winding, and therefore the current produced in the field winding and the torque behavior of the commutator motor are also dependent on the number of turns. By optimally selecting the number of turns of the field windings, it is possible to ensure that a maximum current is not exceeded in the field windings for a torque which is optimum for the rotational speed range. The number of turns of the field windings, is also used to define an optimum changeover rotational speed at which the commutator motor changes over from so-called full-field operation to partial-field operation and at which no impermissibly large changes in current are produced in the field windings. The same also applies for changing over from a first partial field to a further partial field which has a winding design which differs from the first partial field.

In further refinements of the invention, the stator is of two-pole design and/or the commutator motor contains two field winding groups. As a result of such a measure, the commutator motor can be produced in a cost-effective manner.

For example, a commutator motor comprising such refinements is well suited as a drive motor of a laundry drum of a washing machine. Furthermore, control devices for switching on the field winding groups together and individually can likewise be constructed in a simpler and cost-effective manner.

Figure 2:
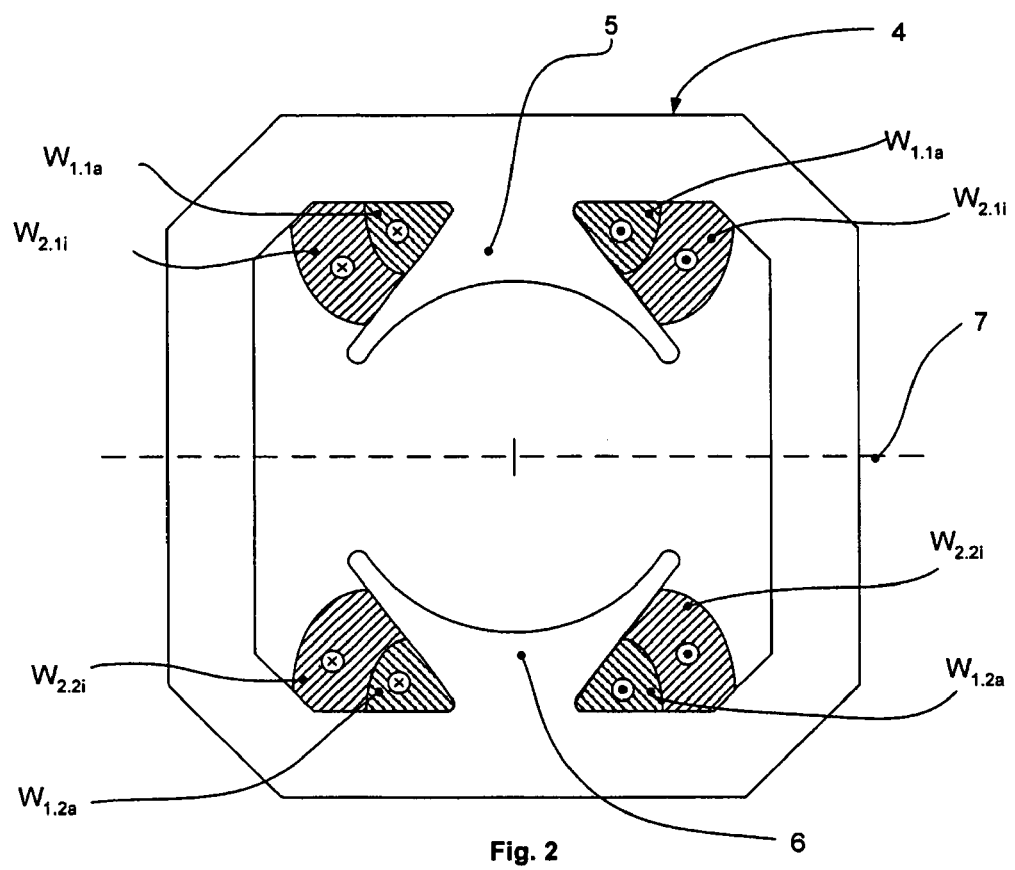
Figure 3:
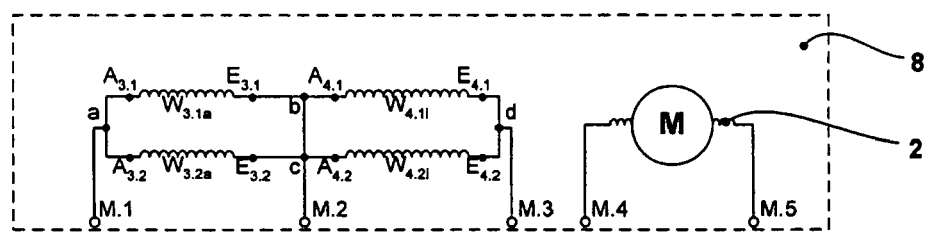

The invention and its advantageous refinements are described in greater detail below with reference to preferred exemplary embodiments and schematic drawings which are not to scale and in which FIG. 1 shows a circuit arrangement of a drive motor and a control device, FIG. 2 shows a sectional illustration through a stator with a field winding arrangement, and FIG. 3 shows a circuit arrangement of a further drive motor.

The exemplary embodiment relates to a two-pole series-wound motor (universal motor) of a drive motor for a washing machine. In order to carry out a laundry treatment program, a laundry drum which is arranged in the washing machine is operated at different rotational speeds which may be, for example, 50 1/min during washing and up to 1800 1/min during spin-drying.

The invention is not restricted to a universal motor which belongs to the group of commutator motors. The commutator motor may also be of four-pole design for example. The commutator motor may also be suitable for shunt excitation.

FIGS. 1 and 2 show a control device 3 of a two-pole commutator motor 1 or universal motor 1, and a section through the stator 4 of the commutator motor 1 with an arrangement of four field windings $W_{1.1}$ to $W_{2.2}$ of the same commutator motor. The field windings $W_{1.1a}$ and $W_{1.2a}$ and, respectively, $W_{2.1i}$ and $W_{2.2i}$ each form a field winding group (partial field or residual field). The starting point $A_{1.1}$ of the field winding $W_{1.1a}$ is connected to the starting point $A_{1.2}$ of the field winding $W_{1.2a}$ at point a, and the end point $E_{1.1}$ of the field winding $W_{1.1a}$ is connected to the end point $E_{1.2}$ of the field winding $W_{1.2a}$ via the connection b-c. In a corresponding manner, the starting points $A_{2.1}$ and $A_{2.2}$ of the field windings $W_{2.1i}$ and $W_{2.2i}$ are connected to one an via the connection b-c, and the end points $E_{2.1}$ and $E_{2.2}$ are connected to one another at point d. The field windings $W_{1.1a}$ and $W_{1.2a}$ and, respectively, $W_{2.1i}$ and $W_{2.2i}$ of a field winding group are therefore connected in parallel. The end of one field winding group of the field windings $W_{1.1a}$ and $W_{1.2a}$ is connected to the start of the other field winding group of the field windings $W_{2.1i}$ and $W_{2.2i}$ and the electrical connection M.2 of the commutator motor 1 via the connecting points b and c. The two field winding groups are therefore connected in series. The indices a and i of the field winding designations W mean that a field winding W is arranged on the outside (index a) or inside (index i) of a pole 5, 6 of the stator 4, that is to say that an outer field winding, for example $W_{1.1a}$, is further away from the plane of symmetry 7 of the pole pair than an inner field winding $W_{2.1i}$.

The commutator motor 1 has electrical connections M.1 to M.3 which are connected to the respective starting or end points of the field winding groups, and electrical connections M.4 and M.5 which are connected to the armature winding 2 of the commutator motor 1. The electrical connections M.1 to M.5 are connected to a control device 3. In order to switch on the field windings W and the armature winding of the commutator motor 1, the control device 3 has a triac T, a field reversal relay X1 and a so-called reversing relay X2. When the triac T which is driven by a microcontroller μC is switched on, a voltage is applied to the field and armature windings. The field reversal relay X1 and the reversing relay X2 can likewise be controlled by the microcontroller by means of a circuit arrangement, with the corresponding control lines of the control device 3 not being illustrated in FIG. 1. In order to operate the commutator motor 1 at a high rotational speed, for example during the spin-drying mode of a washing machine, the field winding group containing field winding coils $W_{1.1a}$ and $W_{1.2a}$ is individually (partial field) switched on using the field reversal relay X1. The two field winding groups (partial field and residual field) which are connected in series are switched on together (full field) for operating the commutator motor 1 at a low or average rotational speed, for example during washing. The circuit of the control device 3 is designed in such a way that the armature winding 2 is connected in series with the field winding groups. The reversing relay X2 changes the direction of rotation of the armature or of the rotor of the commutator motor 1 by reversing the polarity of the armature winding 2.

As illustrated in FIG. 2, all of the field windings W are wound and connected in such a way that current flows through the field windings W in the same direction. The field windings of the partial-field and residual-field field winding groups are positioned symmetrically with respect to the plane of symmetry 7 of the pole pair of the stator 4. The field winding $W_{1.1a}$ is arranged on the outside of the pole 5 and the field winding $W_{1.2a}$ is likewise arranged on the outside of the pole 6 which is opposite the pole 5. The field windings $W_{2.1i}$ and $W_{2.2i}$ of the residual-field field winding group are wound over the field windings $W_{1.1a}$ and $W_{1.2a}$ of the partial-field field winding group and are therefore positioned on the inside of the respective poles 5 and 6.

The field windings $W_{1.1}$ to $W_{2.2}$ of the commutator motor 1 all have an identical number of turns. In the case of such an arrangement and configuration of the field windings, the inner field windings $W_{2.1i}$ and $W_{2.2i}$ have a longer line length than the outer field windings $w_{1.1a}$ and $W_{1.2a}$ and therefore have a greater electrical resistance. Since the field windings W of one field winding group are arranged symmetrically, the field windings W of one field group therefore have identical line lengths and the same electrical resistances. A compensating current cannot be formed between the connecting points b and c during operation of the commutator motor 1 since identical currents flow in the parallel branches of a field winding group on account of the identical resistances. Electrical losses on account of such compensating currents can be effectively avoided by means of a field winding design of this type. Furthermore, the lines of the field windings of one field winding group, which lines are connected in parallel, may have a smaller cross section than the lines of the field windings of a commutator motor whose field windings of a field winding group are connected in series. Selecting a smaller cross section of the winding wire allows the so-called winding head of the field windings to be formed during winding of the field windings in such a way that the electrical losses produced by the winding head are minimized.

In an alternative embodiment of the commutator motor 1, the field windings $W_{1.1}$ and $W_{1.2}$ of the partial field can also be arranged on the inside of the poles 5 and 6 and the field windings $W_{2.1}$ and $W_{2.2}$ of the residual field can be arranged on the outside.

FIG. 3 shows a circuit arrangement of a further alternative embodiment of a commutator motor 8 with two field winding groups, which commutator motor can be operated by the above-described control device 3. In the commutator motor 8, the field windings $W_{3.1a}$ and $W_{3.2a}$ of one field winding group (partial field) and the field windings $W_{4.1i}$ and $W_{4.2i}$ of the other field winding group (residual field) are connected in parallel, with the field windings $W_{3.1a}$ and $W_{3.2a}$ of the partial field each having a lower number of turns than the field windings $W_{4.1i}$ and $W_{4.2i}$ of the residual field. The number of turns of the field windings $W_{3.1a}$ and $W_{3.2a}$ of the partial field is given by the required upper rotational speed range. The commutator motor 8 can also be operated by activating the residual field in an average rotational speed range since the field windings $W_{4.1i}$ and $W_{4.2i}$ have a higher number of turns than the field windings $W_{3.1a}$ and $W_{3.2a}$ of the partial field. According to the invention, the commutator motors may have more than two field winding groups with field windings W which are connected in parallel. According to the invention, the field windings are arranged on the poles 5 and 6 one above the other and symmetrically to the plane of symmetry 7 of the pole pair. Even in an arrangement of this type, the field winding groups are switched on individually or a plurality of groups are switched on together by a control device. The invention can also be applied in commutator motors with shunt excitation.

The invention claimed is:

1. A commutator motor operable with at least one of series excitation and shunt excitation for use as a drive motor of washing machine, the motor comprising a stator having an even number of poles, on each of which a plurality of field windings which each have a starting point and an end point are wound one over the other, the field windings being connected in a parallel arrangement, with a field winding of one pole and the field winding which is situated opposite the field winding symmetrically with respect to the respective plane of symmetry of the pole pair having an identical number of turns and forming one field winding group, wherein the starting points of the field windings of one field winding group are connected to one another, and the end points of the field windings of the same field winding group are connected to one another, the field winding groups being connected in a series arrangement and including a plurality of motor control electrical connections for selectively accessing either one or multiple field winding groups for motor speed control.

2. The commutator motor as claimed in claim 1, wherein the end point of one field winding group is connected to the starting point of another field winding group and an electrical connection of the commutator motor.

3. The commutator motor as claimed in claim 1, wherein the field windings of different field winding groups have a different number of turns.

4. The commutator motor as claimed in claim 1, wherein the stator is of two-pole design.

5. The commutator motor as claimed in claim 1, wherein two field winding groups are present.

6. A commutator motor operable with at least one of series excitation and shunt excitation for use as a drive motor of washing machine, the motor comprising:
a stator having a plurality of poles;
a plurality of field windings disposed on each of the plurality of poles, with individual field windings being arranged with a predetermined symmetry creating at least two groups of corresponding field windings including a first winding group and a second winding group wherein the field windings within the second winding groups are wound over the field windings of the first winding group wherein individual field windings within a group are arranged in parallel with the field winding groups arranged in series; and
a plurality of motor control electrical connections for selectively accessing either one or multiple field winding groups for motor speed control.

* * * * *